(12) United States Patent
Maeda

(10) Patent No.: US 11,649,369 B2
(45) Date of Patent: May 16, 2023

(54) NONAQUEOUS ELECTROLYTE BATTERY

(71) Applicant: ZEON CORPORATION, Tokyo (JP)

(72) Inventor: Kouichirou Maeda, Tokyo (JP)

(73) Assignee: ZEON CORPORATION, Tokyo (JP)

(*) Notice: Subject to any disclaimer, the term of this patent is extended or adjusted under 35 U.S.C. 154(b) by 121 days.

(21) Appl. No.: 17/359,645

(22) Filed: Jun. 28, 2021

(65) Prior Publication Data

US 2021/0328294 A1 Oct. 21, 2021

Related U.S. Application Data

(62) Division of application No. 16/090,654, filed as application No. PCT/JP2017/015379 on Apr. 14, 2017, now abandoned.

(30) Foreign Application Priority Data

Apr. 15, 2016 (JP) ................. 2016-081721

(51) Int. Cl.
| | | |
|---|---|---|
| *C09D 123/12* | (2006.01) | |
| *C09J 123/08* | (2006.01) | |
| *C08L 23/06* | (2006.01) | |
| *C08L 23/12* | (2006.01) | |
| *C08L 23/26* | (2006.01) | |
| *H01M 50/198* | (2021.01) | |
| *H01M 50/193* | (2021.01) | |
| *H01M 50/183* | (2021.01) | |
| *C09D 5/02* | (2006.01) | |
| *C09D 123/06* | (2006.01) | |
| *H01M 10/0525* | (2010.01) | |

(52) U.S. Cl.
CPC .......... *C09D 123/12* (2013.01); *C08L 23/06* (2013.01); *C08L 23/12* (2013.01); *C08L 23/26* (2013.01); *C09D 5/022* (2013.01); *C09D 123/06* (2013.01); *C09J 123/0876* (2013.01); *H01M 10/0525* (2013.01); *H01M 50/183* (2021.01); *H01M 50/193* (2021.01); *H01M 50/198* (2021.01); *C08L 2201/54* (2013.01); *H01M 2300/0025* (2013.01); *Y02E 60/10* (2013.01)

(58) Field of Classification Search
CPC .......... C09D 123/12; C09D 123/0876; C09D 5/022; C09D 123/06; C08L 23/06; C08L 23/12; H01M 50/198; H01M 50/193; H01M 50/183; H01M 10/0525; H01M 2300/0025; Y02E 60/10
See application file for complete search history.

(56) References Cited

U.S. PATENT DOCUMENTS

| | | |
|---|---|---|
| 5,900,454 A | 5/1999 | Kirchmeyer et al. |
| 2002/0165341 A1 | 11/2002 | Weitzel |
| 2015/0240131 A1 | 8/2015 | Furuya et al. |
| 2018/0134880 A1 | 5/2018 | Maeda |

FOREIGN PATENT DOCUMENTS

| | | | |
|---|---|---|---|
| JP | S5384122 | A | 7/1978 |
| JP | S5516352 | A | 2/1980 |
| JP | S5530148 | A | 3/1980 |
| JP | S59112565 | A | 6/1984 |
| JP | S631706 | B2 | 1/1988 |
| JP | S63250051 | A | 10/1988 |
| JP | H0696750 | A | 4/1994 |
| JP | 2002241427 | A | 8/2002 |
| JP | 3574276 | B2 | 10/2004 |
| JP | 2006107935 | A | 4/2006 |
| JP | 2006324015 | A | 11/2006 |
| JP | 3956523 | B2 | 8/2007 |
| JP | 2009-110883 | * | 5/2009 |
| WO | 2014054406 | A1 | 4/2014 |

OTHER PUBLICATIONS

Machine English translation of JP 2009-110883, Kazuo et al., May 21, 2009.*
Nov. 15, 2021, Office Action issued by the United States Patent and Trademark Office in U.S. Appl. No. 16/090,654.
Sep. 6, 2022, Communication pursuant to Article 94(3) EPC issued by the European Patent Office in the corresponding European Patent Application No. 17782537.9.
Sep. 7, 2021, Communication pursuant to Article 94(3) EPC issued by the European Patent Office in the corresponding European Patent Application No. 17782537.9.
Sep. 10, 2021, Office Action issued by the United States Patent and Trademark Office in U.S. Appl. No. 16/090,654.
Oct. 16, 2018, International Preliminary Report on Patentability issued in the International Patent Application No. PCT/JP2017/015379.
Sep. 5, 2019, the Extended European Search Report issued by the European Patent Office in the correspondingEuropean Patent Application No. 17782537.9.

(Continued)

*Primary Examiner* — Patrick D Niland
(74) *Attorney, Agent, or Firm* — Kenja IP Law PC

(57) ABSTRACT

Disclosed is a nonaqueous electrolyte battery using an aqueous sealant composition. The aqueous sealant composition comprises an aqueous dispersion in an amount of 70 mass % or more and 97 mass % or less by mass of solid content, wherein the aqueous dispersion comprises an olefinic polymer as a main component, and a water-soluble polymer in an amount of 3 mass % or more and 30 mass % or less by mass of solid content. The aqueous dispersion comprises an olefinic polymer as a main component. The olefinic polymer is a modified olefinic polymer. The modified olefinic polymer is a partial copolymer of a polymer selected from a group consisting of polyethylene, polypropylene, polybutene and ethylene-propylene polymers, and a polymerizable unsaturated organic acid selected from a group consisting of maleic anhydride, acrylic acid, methacrylic acid and esters thereof.

6 Claims, No Drawings

(56) References Cited

OTHER PUBLICATIONS

Mar. 6, 2023, Communication pursuant to Article 94(3) EPC issued by the European Patent Office in the corresponding European Patent Application No. 17782537.9.

* cited by examiner

NONAQUEOUS ELECTROLYTE BATTERY

CROSS-REFERENCE TO RELATED APPLICATION

This application is a divisional application of U.S. application Ser. No. 16/090,654 filed Oct. 2, 2018 which is a National Stage Application of PCT/JP2017/015379 filed Apr. 14, 2017 which claims priority to Japanese Patent Application No. 2016-081721 filed on Apr. 15, 2016. The disclosures of the prior applications are hereby incorporated by reference herein in their entirety.

TECHNICAL FIELD

The present disclosure relates to an aqueous sealant composition used for a nonaqueous electrolyte battery.

BACKGROUND

Lithium ion secondary batteries are widely used as power sources for small electronic devices such as notebook computers, mobile phones, PDAs, and the like. Further, in recent years, lithium ion secondary batteries are also used for automotive applications. As the usage range of lithium ion secondary batteries expands, demands for the performance and safety of lithium ion secondary batteries (hereinafter sometimes simply referred to as "batteries") are increasing. These batteries are usually repeatedly used by virtue of charge and discharge operations. However, due to repeated charge and discharge, sometimes volume fluctuation and heat generation occur in the electrodes, and the pressure inside the battery rises, such that the electrolytic solution leaks to the outside. In this case, not only the battery characteristics deteriorate but also problems such as heat generation due to the reduction of the electrolytic solution and corrosion of the device due to the leaked electrolytic solution occur. For example, when an electrolytic solution is used for a lithium ion secondary battery, since the electrolytic solution is organic and i s extremely apt to be damaged by moisture, such a lithium ion secondary battery is required to have a high sealability to completely prevent moisture from entering the inside of the battery and completely prevent leakage of the electrolytic solution.

For example, a lithium ion secondary battery is housed in a metal container to seal its power generating element, and in order to prevent a short circuit between the positive electrode and the negative electrode, it is necessary to insulate the positive electrode terminal from the negative electrode terminal. Generally, a gasket made of an insulating material is used in the opening of the metal container containing the power generating element for insulation and sealing between the positive electrode and the negative electrode. As the insulating material, it is well known to use a resin insulating gasket (for example, refer to PTL 1).

In order to further strengthen sealing with such an insulating gasket, it is also proposed to use an insulating gasket and a sealant in combination (for example, refer to PTL 2 to 4). In this technique, the sealability between the insulating gasket and the metal container is enhanced by applying a sealant to the insulating gasket or the metal container and then attaching the insulating gasket to the metal container.

Examples of such a sealant include pitch-based materials such as coal tar, asphalt and the like, and materials obtained by adding a polymer as a modifier to a pitch-based material (for example, refer to PTL 5). In addition to pitch-based materials, a butyl rubber (for example, refer to PTL 6), a diene rubber having a predetermined weight-average molecular weight (for example, refer to PTL 7), and a block polymer containing a diene monomer (for example, refer to PTL 8) are also proposed.

Incidentally, in recent years, the influence of volatile organic compounds (VOC) on the environment has become a problem. The aforementioned sealants are used as a sealant composition dissolved or dispersed in an organic solvent, which is a VOC. Therefore, a sealant composition not using VOC is required.

PTL 9 proposes an aqueous sealant composition, however, the performance thereof required for a sealant is insufficient. For example, the strength of the sealant layer formed by the aqueous sealant composition is insufficient compared with a sealant layer obtained by a sealant composition using an organic solvent. In addition, PTL 10 proposes an aqueous sealant composition not using VOC, however, it is intended for a battery using an aqueous electrolyte solution, and no consideration has been given to a nonaqueous electrolyte battery.

CITATION LIST

Patent Literature

PTL 1: JPS 53-84122 A
PTL 2: JPS 55-30148 A
PTL 3: JPS 55-16352 A
PTL 4: JPS 59-112565 A
PTL 5: JPH 06-96750 A
PTL 6: WO 2014/054406 A1
PTL 7: JP 3574276 B2
PTL 8: JP 3956523 B2
PTL 9: JPS 63-1706 B2
PTL 10: JP 2006-107935 A

SUMMARY

Technical Problem

An objective of the present disclosure is to provide an aqueous sealant composition for a nonaqueous electrolyte battery by which a sealant layer having excellent properties can be obtained.

Solution to Problem

The inventor conducted a diligent investigation, and through this investigation, the inventor discovered that the objective set forth above can be achieved through use of an aqueous dispersion at a predetermined ratio, wherein the aqueous dispersion comprises an olefinic polymer as a main component, and thereby completed the present disclosure.

Specifically, the present disclosure provides the following.

(1) An aqueous sealant composition for a nonaqueous electrolyte battery, comprising an aqueous dispersion in an amount of 70 mass % or more and 97 mass % or less by mass of solid content, wherein the aqueous dispersion comprises an olefinic polymer as a main component.

(2) The aqueous sealant composition for a nonaqueous electrolyte battery according to (1), further comprising: a water-soluble polymer in an amount of 3 mass % or more and 30 mass % or less by mass of solid content; and a total solid content concentration of 5 mass % or more and 70 mass % or less.

(3) The aqueous sealant composition for a nonaqueous electrolyte battery according to (2), wherein the water-soluble polymer has a 4 mass % aqueous solution viscosity of 4 mPa×s or more and 500 mPa×s or less.

(4) The aqueous sealant composition for a nonaqueous electrolyte battery according to any one of (1) to (3), wherein the aqueous dispersion is a dispersion of polyethylene or polypropylene in water, or a self-emulsified modified olefinic polymer.

Advantageous Effect

According to the presently disclosed aqueous sealant composition for a nonaqueous electrolyte battery, a sealant layer having excellent properties can be obtained.

DETAILED DESCRIPTION

The following describes an aqueous sealant composition for a nonaqueous electrolyte battery according to the present disclosure. The presently disclosed aqueous sealant composition for a nonaqueous electrolyte battery (hereinafter referred to also as "aqueous sealant composition") comprises an aqueous dispersion in an amount of 70 mass % or more and 97 mass % or less by mass of solid content, wherein the aqueous dispersion comprises an olefinic polymer as a main component.

(Aqueous Dispersion Comprising Olefinic Polymer as Main Component)

The olefinic polymer comprised as a main component in the aqueous dispersion is not particularly limited as long as it is a polymer comprising an olefinic monomer unit obtained by polymerizing an olefinic monomer such as ethylene, propylene or the like. Here, the olefinic polymer is preferably comprised in the aqueous dispersion in an amount of 20 mass % or more and 100 mass % or less, and more preferably in an amount of 30 mass % or more and 100 mass % or less by mass of solid content (in terms of solid content).

Further, the solid content concentration of the aqueous dispersion comprising the olefinic polymer as a main component is preferably 20 mass % or more, more preferably 30 mass % or more, and preferably 70 mass % or less, more preferably 65 mass % or less.

The olefinic polymer may be a homopolymer of an olefinic monomer, a copolymer of an olefinic monomer, or a copolymer of an olefinic monomer and a monomer other than an olefinic monomer.

Here, the monomer other than an olefinic monomer is not particularly limited as long as it is copolymerizable with an olefinic monomer, and examples thereof include cyano group-containing vinyl monomers, amino group-containing vinyl monomers, pyridyl group-containing vinyl monomers, alkoxyl group-containing vinyl monomers, aromatic vinyl monomers, and the like. Of these examples, cyano group-containing vinyl monomers and aromatic vinyl monomers are preferable, and aromatic vinyl monomers are more preferable. These monomers copolymerizable with an olefinic monomer can be used alone or in combination of two or more thereof.

Examples of aromatic vinyl monomers include styrene, α-methyl styrene, 2-methyl styrene, 3-methyl styrene, 4-methyl styrene, 2,4-diisopropylstyrene, 2,4-dimethylstyrene, 4-t-butyl styrene, 5-t-butyl-2-methyl styrene, N,N-dimethylaminoethyl styrene, N,N-diethylaminoethylstyrene, and the like.

These aromatic vinyl monomers can be used alone or in combination of two or more thereof.

Examples of the olefinic polymer include polyethylene, polypropylene (PP), polybutene, polybutadiene, butadiene-isoprene copolymers, polyisoprene, ethylene-vinyl acetate copolymers (EVA), ethylene-ethyl acrylate copolymers, ethylene-propylene polymers (EPR), ethylene-propylene-diene terpolymers (EPDM), styrene-butadiene block copolymer hydrides (SEB, SEBS) and the like, which can be used alone or in combination of two or more thereof.

Of these examples, polyethylene or polypropylene is preferable as the olefinic polymer. As the aqueous dispersion, it is preferable to use polyethylene or polypropylene dispersed in water.

The olefinic polymer is produced, for example, by polymerizing a monomer composition containing an aforementioned monomer in an aqueous solvent.

The aqueous solvent is not particularly limited as long as the olefinic polymer can be dispersed, and is selected from aqueous solvents having a boiling point at normal pressure of preferably 80° C. or more and 350° C. or less, more preferably 100° C. or more and 300° C. or less.

More particularly, water is preferable as the aqueous solvent from the viewpoint that it is incombustible and a dispersion of an olefinic polymer can be easily obtained. Further, it is also considerable to use water as a main solvent and mix an aqueous solvent other than water therewith, as long as the effect of the present disclosure is not impaired and the dispersion state of the olefinic polymer is secured.

The polymerization method of the olefinic polymer is not particularly limited, and for example, any of solution polymerization, suspension polymerization, bulk polymerization, and emulsion polymerization may be used. Alternatively, the polymerization method may be any of the methods including ionic polymerization, radical polymerization, and living radical polymerization. The emulsion polymerization method is particularly preferable from the viewpoint of production efficiency. According to the emulsion polymerization method, for example, it is easy to obtain a high molecular weight substance, and since the olefinic polymer can be obtained in a latex state in which it is dispersed in water as it is, a redispersion process becomes unnecessary, and the latex can be used as it is as an aqueous dispersion comprising an olefinic polymer as a main component for preparing a presently disclosed aqueous sealant composition. The emulsion polymerization can be carried out by a standard method. In the emulsion polymerization, commonly used polymerization auxiliary materials such as an emulsifier, a polymerization initiator, a molecular weight modifier, a chain transfer agent and the like can be used.

Further, in the present disclosure, as the olefinic polymer, it is preferable to use a modified olefinic polymer which is a partial copolymer of an olefinic polymer and a polymerizable unsaturated organic acid. Examples of polymerizable unsaturated organic acids include maleic anhydride, acrylic acid, methacrylic acid, and esters thereof. These polymerizable unsaturated organic acids can be used alone or as a combination of two or more thereof.

A modified olefinic polymer can be obtained by polymerizing a polymerizable unsaturated organic acid and a polyolefin using a polymerization method such as random copolymerization, block copolymerization, graft copolymerization, or the like.

As the modified olefinic polymer, commercially available olefinic polymers may be used. Specific examples of commercially available products include Zaikthene-A-GH, Zaikthene-AC, Zaikthene-NC, Zaikthene-N, Zaikthene-L (that are manufactured by Sumitomo Seika Chemicals Company, Limited), Arrow base SA-1200Arrow base SB-1200Arrow base SE-1200, Arrow base SB-1010 (that are manufactured by Unitika Ltd.), High-tech S-3121 High-tech S-3123 High-tech S-3127 (that are manufactured by TOHO Chemical Industry Co., Ltd.), and the like.

It is preferable to use a self-emulsified modified olefinic polymer.

(Aqueous Sealant Composition)

The presently disclosed aqueous sealant composition comprises an aqueous dispersion comprising the olefinic polymer as a main component, in an amount of 70 mass % or more, preferably 80 mass % or more, further preferably 85 mass % or more, and 97 mass % or less, preferably 95 mass % or less, further preferably 93 mass % or less by mass of solid content (in terms of solid content). When the content percentage of the aqueous dispersion in the aqueous sealant composition is excessively high, it is difficult to obtain a uniform film (sealant layer). On the other hand, when the content percentage of the aqueous dispersion in the aqueous sealant composition is excessively low, the flexibility of the sealant layer obtained using the aqueous sealant composition decreases. That is, the sealing performance deteriorates.

Further, the viscosity of the aqueous sealant composition is preferably 10 mPa×s or more, more preferably 100 mPa×s or more, and preferably 10,000 mPa×s or less, more preferably 1,000 mPa×s or less. When the viscosity of the aqueous sealant composition is within such a range, it is possible to suppress a phenomenon that the viscosity is excessively high, making it difficult to coat. It is also possible to suppress a phenomenon that the viscosity is excessively low, making it difficult to form a uniform film. Note that the viscosity is a viscosity value measured at a liquid temperature of 20° C., using a Brookfield viscometer (B type viscometer).

It is preferable that the presently disclosed aqueous sealant composition comprises a water-soluble polymer other than the aqueous dispersion comprising the olefinic polymer as a main component. Examples of water-soluble polymers include polyvinyl alcohol, polyacrylic acid, polystyrene sulfonic acid, and the like. Of these examples, polyvinyl alcohol is preferable, and polyvinyl alcohol having a saponification rate of 98 mol % or more, which is said to be fully saponified type, is particularly preferable.

The aforementioned water-soluble polymers may be used alone or in combination of two or more thereof in any proportion.

The water-soluble polymer preferably has a 4 mass % aqueous solution viscosity of 4 mPa×s or more and 500 mPa×s or less. Note that the viscosity is a viscosity value measured at a liquid temperature of 20° C., using a Brookfield viscometer (B type viscometer).

Further, the content percentage of the water-soluble polymer in the aqueous sealant composition is preferably 3 mass % or more, more preferably 5 mass % or more, further preferably 7 mass % or more, and preferably 30 mass % or less, more preferably 20 mass % or less, further preferably 15 mass % or less, by mass of solid content (in terms of solid content). When the content percentage of the water-soluble polymer is within such a range, it is possible to suppress a phenomenon that the content percentage of the water-soluble polymer is excessively high, such that the flexibility of the obtained sealant layer decreases, that is, the sealing performance deteriorates, and it is also possible to suppress a phenomenon that the content percentage of the water-soluble polymer is excessively low, making it difficult to obtain a uniform film (sealant layer).

Furthermore, the solid content concentration of the presently disclosed aqueous sealant composition is preferably 5 mass % or more, more preferably 20 mass % or more, further preferably 30 mass % or more, particularly 35 mass % or more, and preferably 70 mass % or less, more preferably 60 mass % or less, further preferably 50 mass % or less, particularly 43 mass % or less. When the total solid content concentration is within such a range, it is possible to suppress a phenomenon that the total solid content concentration is excessively high, making it difficult to obtain a sealant layer having a desired film thickness. It is also possible to suppress a phenomenon that the total solid content concentration is excessively low, such that a longer drying time is required at the time of formation of a sealant layer. The total solid content concentration of the aqueous sealant composition can be adjusted by a known method such as concentration using a rotary evaporator.

Moreover, if necessary, additives such as colorants and the like may be added to the presently disclosed aqueous sealant composition. A colorant that can be added is preferably one that does not react with an electrolyte solution and does not dissolve in an electrolyte solution, and examples thereof include various organic and inorganic pigments. Of these examples, carbon black, particularly carbon black having a particle diameter of 0.1 µm or less such as furnace black, channel black and the like is preferable. When adding such a colorant, it is necessary to dissolve or disperse it sufficiently uniformly in the composition, and when using a granulated colorant or a colorant having an aggregated structure, it is better to disperse it with a ball mill, a sand mill, ultrasonic waves, or the like. The amount of such additives such as colorants to be added may be an arbitrary amount as necessary, and is usually 0.01 mass % or more and 20 mass % or less, preferably 0.01 mass % or more and 5 mass % or less, and more preferably 0.02 mass % or more and 3 mass % or less, with respect to the amount of the olefinic polymer (100 mass %). When the amount of additives is within such a range, it is possible to suppress a phenomenon that the addition amount of additives is excessively large, such that the flexibility of the sealant layer decreases, resulting in cracking.

The producing method for the presently disclosed aqueous sealant composition is not particularly limited, and for example, a method of adding other components such as a water-soluble polymer and additives to an aqueous dispersion comprising an olefinic polymer as a main component; a method of mixing an aqueous dispersion comprising an olefinic polymer as a main component and an aqueous solution of a water-soluble polymer that were respectively prepared, and then adding other components such as additives thereto; and the like.

(Nonaqueous Electrolyte Battery)

A nonaqueous electrolyte battery using the presently disclosed aqueous sealant composition is such that, a sealant layer formed from the aforementioned aqueous sealant composition is provided between an insulating gasket attached to the opening of a metal container housing the power generating element and the metal container, and/or between the insulating gasket and a sealing body. The material of the metal container, the power generating element, and the insulating gasket used for the nonaqueous electrolyte battery may be ones commonly used. That is, the nonaqueous electrolyte battery has its power generating element housed in a metal container and sealed.

The power generating element may be an electrolyte, active materials for positive electrode and negative electrode, a separator, or the like. As the electrolyte, an electrolyte solution comprising a supporting electrolyte and an organic electrolytic solution solvent is used.

In the nonaqueous electrolyte battery, as the supporting electrolyte which constitutes the electrolytic solution, for example, a compound which is easily hydrolyzed through reaction with water, such as lithium compounds such as $LiPF_6$, $LiBF_4$, $LiClO_4$ and the like, is used. As the nonaqueous electrolyte solvent, for example, a combustible organic compound such as propylene carbonate (PC), ethylene carbonate (EC), diethyl carbonate (DEC) or the like is used. As the insulating gasket, it is preferable to use a material made of a polyolefin resin such as polyethylene, polypropylene, ethylene copolymerized polypropylene or the like, which is generally said to have a high electrolytic solution resistance. Further, as the polyolefin resin, it is better to use one having a heat distortion temperature measured by JIS K7207 of preferably 90° C. or more and 200° C. or less, more preferably 90° C. or more and 150° C. or less, and further preferably 95° C. or more and 130° C. or less. When the heat distortion temperature of the polyolefin resin is within such a range, it is possible to suppress a phenomenon that the heat distortion temperature is excessively high, such that the bending elastic modulus at normal temperature is too high, causing deformation when attaching the insulating gasket, and thus resulting in cracking. It is also possible to suppress a phenomenon that the heat distortion temperature is excessively low, such that the resistance of the insulating gasket at high temperature is poor and the sealability deteriorates.

A sealant layer of the nonaqueous electrolyte battery can be formed, for example, by the following procedure. Initially, a predetermined amount of the aqueous sealant composition is fed to and applied to the surface of the metal container and/or the surface of the insulating gasket with a metering pump such as an air-driven metering dispenser, a roller pump, a gear pump or the like. After coating, natural drying is carried out while maintaining the horizontality so as to prevent the aqueous sealant composition from biasing, and thereafter the aqueous solvent is removed to form a thin layer.

The coating method is not limited to the method using a metering pump, and may be manually performed using a brush if the amount of work is small. In addition, for drying, forced drying using a heating device may be performed instead of natural drying, and in this case, drying in a short time becomes possible, enabling an industrially more suitable process.

The thickness of the sealant layer formed by the above method may be freely selected according to the sizes of the metal container and the insulating gasket, and is usually 0.1 μm or more and 1000 μm or less. When the thickness of the sealant layer is within such a range, it is possible to suppress a phenomenon that the layer thickness is excessively insufficient, such that problems such as electrolyte solution leakage and moisture intrusion may occur and the layer may be cut. It is also possible to suppress a phenomenon that the thickness of the sealant layer is excessively thick, making it difficult to form a layer.

Note that as the nonaqueous electrolyte battery in which the presently disclosed aqueous sealant composition is used, a lithium ion secondary battery is preferable.

The following describes the present disclosure through examples. However, the present disclosure is not limited to these examples. Note that "parts" and "%" in the present examples are by mass unless otherwise specified. In the examples and comparative examples, evaluation of wettability, evaluation of film strength, measurement of viscosity, evaluation of flexibility and evaluation of sealability were carried out as follows.

(Wettability (Coating Film Appearance))

The appearance of the surface of the sealant layer of each test piece obtained in the examples and comparative examples was visually observed. A case in which no defect such as a crack, a pinhole or the like was observed on the surface of the sealant layer was given an evaluation of "good", and a case in which a defect such as a crack, a pinhole or the like, or unevenness was observed on the surface of the sealant layer was given an evaluation of "poor". The results are listed in Table 1.

(Film Strength (Ppeel Strength))

The peel strength of each test piece having a sealant layer formed on an aluminum foil obtained in the examples and comparative examples was measured by a 180° peeling method in accordance with JIS Z0237. More particularly, an aluminum tape with an adhesive was laminated to each test piece cut into a ribbon-like shape having a width of 20 mm, and the peel strength was measured at a tensile rate of 200 mm/min at 23° C. using a tensile tester. The results are listed in Table 1. Note that the greater the peel strength, the better the film strength (strength of the sealant layer).

(Viscosity)

In the examples and comparative examples, the viscosity of each aqueous sealant composition was measured at a liquid temperature of 20° C. using a B type viscometer (Brookfield viscometer, type BL, manufactured by TOKYO KEIKI INC.). The results are listed in Table 1.

(Flexibility (Bending Tolerance))

Each test piece having a sealant layer formed on an aluminum foil obtained in the examples and comparative examples was immersed in methanol at −30° C. for 1 hour and was folded with the sealant layer on the outside immediately after being taken out. The bent portion was observed as to whether cracking, peeling or the like is present. A case in which no cracking, peeling and the like was observed was given an evaluation of "good", and a case in which cracking, peeling or the like was observed was given an evaluation of "poor". The results are listed in Table 1.

(Sealability)

A film having a size of 1 cm×1 cm was produced from each aqueous sealant composition obtained in the examples and comparative examples, and the mass Mo was measured. Then, each film was immersed in a simulated electrolytic solution (a mixed solution of ethylene carbonate (EC) and diethyl carbonate (DEC) (EC/DEC=1/2: volume ratio) in which 1.0 mol/L of $LiPF_6$ was dissolved) at 60° C. for 72 hours, and the mass Mi was measured. The degree of swelling was calculated in accordance with $(M_1-M_0)/M_0 \times 100$ (%). Note that the smaller the degree of swelling, the better the sealability. The results are listed in Table 1.

EXAMPLES

Example 1

(Aqueous Sealant Composition)

To 95 parts by mass of solid content of Zaikthene NC as a aqueous dispersion comprising an olefinic polymer as a main component (manufactured by Sumitomo Seika Chemicals Company, Limited, content of olefinic polymer (in terms of solid content): 100 mass %), 5 parts by mass of solid content of a 10 mass % aqueous solution of polyvinyl alcohol (polyvinyl alcohol JF17 manufactured by JAPAN VAM & POVAL CO., LTD., viscosity of a 4 mass % aqueous solution: 4.5 mPa×s, saponification rate: 98 mol %) was added as a water-soluble polymer to obtain an aqueous sealant composition. The total solid content concentration of the obtained aqueous sealant composition was 45 mass %.

(Test Piece)

The obtained aqueous sealant composition was cast on an aluminum foil (thickness: 20 μm) with a doctor blade having a gap of 200 μm and was then subjected to heat drying at 80° C. for 20 minutes to form a film-like sealant layer to obtain a test piece.

Example 2

An aqueous sealant composition was produced in the same manner as in Example 1 except that the amount of Zaikthene NC was changed to 90 parts by mass of solid content and the amount of polyvinyl alcohol was changed to 10 parts by mass of solid content. The total solid content concentration of the obtained aqueous sealant composition was 42 mass %.

A test piece was produced in the same manner as in Example 1 except that the above aqueous sealant composition was used.

Example 3

An aqueous sealant composition was produced in the same manner as in Example 1 except that as the aqueous dispersion comprising an olefinic polymer as a main component, 90 parts by mass of solid content of Arrow Base SB-1010 (manufactured by Unitika Ltd., content of olefinic polymer (in terms of solid content): 100 mass %) was used instead of Zaikthene NC, and the amount of polyvinyl alcohol was changed to 10 parts by mass of solid content. The total solid content concentration of the obtained aqueous sealant composition was 35 mass %.

A test piece was produced in the same manner as in Example 1 except that the above aqueous sealant composition was used.

Comparative Example 1

An aqueous sealant composition was produced in the same manner as in Example 1 except that the amount of Zaikthene NC was changed to 50 parts by mass of solid content and the amount of polyvinyl alcohol was changed to 50 parts by mass of solid content. The total solid content concentration of the obtained aqueous sealant composition was 20 mass %.

A test piece was produced in the same manner as in Example 1 except that the above aqueous sealant composition was used.

Comparative Example 2

An aqueous sealant composition was produced in the same manner as in Example 1 except that as the aqueous dispersion comprising an olefinic polymer as a main component, 100 parts by mass of solid content of Arrow Base SB-1010 was used instead of Zaikthene NC, and no polyvinyl alcohol was used. The total solid content concentration of the obtained aqueous sealant composition was 50 mass %.

A test piece was produced in the same manner as in Example 1 except that the above aqueous sealant composition was used.

TABLE 1

| | | | Example 1 | Example 2 | Example 3 | Comparative example 1 | Comparative example 2 |
|---|---|---|---|---|---|---|---|
| Aqueous sealant composition | Solid composition | Zaikthene NC (mass %) | 95 | 90 | — | 50 | — |
| | | Arrow Base SB-1010 (mass %) | — | — | 90 | — | 100 |
| | | Polyvinyl alcohol (mass %) | 5 | 10 | 10 | 50 | — |
| | Total solid content concentration (mass %) | | 45 | 42 | 35 | 20 | 50 |
| Evaluation items | Wettability (coating film appearance) | | Good | Good | Good | Poor (cracking) | Poor (unevenness) |
| | Film strength (peel strength) (N/20 mm) | | 15 | 18 | 25 | 5 | 20 |
| | Viscosity (mPa × s) | | 180 | 250 | 220 | 5300 | 80 |
| | Flexibility (bending tolerance) | | Good | Good | Good | Poor | Poor |
| | Sealability | | 1 mass % > | 1 mass % > | 1 mass % > | 5 mass % | 7 mass % |

As can be seen from Table 1 it was possible to form a sealant layer that is excellent in wettability (coating film appearance), film strength (peel strength), flexibility (bending tolerance) and sealability, by using an aqueous sealant composition for a nonaqueous electrolyte battery comprising an aqueous dispersion in an amount of 70 mass % or more and 97 mass % or less by mass of solid content, wherein the aqueous dispersion comprises an olefinic polymer as a main component.

The invention claimed is:

1. A nonaqueous electrolyte battery using an aqueous sealant composition in which a sealant layer formed from the aqueous sealant composition is provided between an insulating gasket attached to an opening of a metal container housing a power generating element and the metal container, and/or between the insulating gasket and a sealing body, wherein the aqueous sealant composition comprises an aqueous dispersion in an amount of 70 mass % or more and 97 mass % or less by mass of solid content, wherein the aqueous dispersion comprises an olefinic polymer as a main component, and a water-soluble polymer in an amount of 3 mass % or more and 30 mass % or less by mass of solid content, the aqueous dispersion comprises an olefinic polymer as a main component, the olefinic polymer is a modified olefinic polymer, and the modified olefinic polymer is a partial copolymer of a polymer selected from a group consisting of polyethylene, polypropylene, polybutene and ethylene-propylene polymers, and a polymerizable unsaturated organic acid selected from a group consisting of maleic anhydride, acrylic acid, methacrylic acid and esters thereof.

2. The nonaqueous electrolyte battery according to claim 1, wherein a total solid content concentration of the aqueous sealant composition is 5 mass % or more and 70 mass % or less.

3. The nonaqueous electrolyte battery according to claim 1, wherein the water-soluble polymer has a 4 mass % aqueous solution viscosity of 4 mPa×s or more and 500 mPa×s or less.

4. The nonaqueous electrolyte battery according to claim 1, wherein the aqueous dispersion is a self-emulsified modified olefinic polymer.

5. The nonaqueous electrolyte battery according to claim 2, wherein the aqueous dispersion is a self-emulsified modified olefinic polymer.

6. The nonaqueous electrolyte battery according to claim 3, wherein the aqueous dispersion is a self-emulsified modified olefinic polymer.

* * * * *